US012743723B2

(12) United States Patent
Chien et al.

(10) Patent No.: US 12,743,723 B2
(45) **Date of Patent: *Sep. 22, 2026**

(54) PROVIDING AND USING A DIGITAL ASSET DELIVERY SERVICE

(71) Applicant: AT&T Intellectual Property I, L.P., Atlanta, GA (US)

(72) Inventors: Ginger Chien, Bellevue, WA (US); Norma Berry, Columbia, SC (US); Joan Gingery, San Ramon, CA (US); Jennifer Joy, Santa Cruz, CA (US)

(73) Assignee: AT&T Intellectual Property I, I.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/971,134

(22) Filed: Dec. 6, 2024

(65) Prior Publication Data

US 2025/0095060 A1 Mar. 20, 2025

Related U.S. Application Data

(63) Continuation of application No. 17/974,587, filed on Oct. 27, 2022, now Pat. No. 12,165,197.

(51) Int. Cl.
*G06F 15/16* (2006.01)
*G06Q 30/08* (2012.01)

(52) U.S. Cl.
CPC .................................... *G06Q 30/08* (2013.01)

(58) Field of Classification Search
CPC ........ G06Q 30/08; G06Q 40/06; G06Q 40/04; G06Q 20/065
See application file for complete search history.

(56) References Cited

U.S. PATENT DOCUMENTS

| | | | |
|---|---|---|---|
| 7,263,497 B1 | 8/2007 | Wiser | |
| 9,838,869 B1 | 12/2017 | Bye | |
| 11,522,700 B1 * | 12/2022 | Auerbach | H04L 9/3213 |
| 12,165,197 B2 * | 12/2024 | Chien | G06Q 30/08 |
| 2006/0031387 A1 | 2/2006 | Hamzeh | |
| 2022/0201056 A1 | 6/2022 | Zajac | |
| 2022/0253842 A1 * | 8/2022 | James | H04L 9/50 |
| 2022/0318852 A1 | 10/2022 | Blaikie, III | |

OTHER PUBLICATIONS

U.S. Office Action mailed on Apr. 11, 2024 in U.S. Appl. No. 17/974,587.
U.S. Notice of Allowance mailed on Aug. 5, 2024 in U.S. Appl. No. 17/974,587.

* cited by examiner

*Primary Examiner* — John B Walsh
(74) *Attorney, Agent, or Firm* — Hartman & Citrin LLC

(57) ABSTRACT

Providing and using a digital asset delivery service can include obtaining a digital asset delivery request that identifies a digital asset that is to be provided to a recipient device, the recipient device, and delivery requirements associated with providing the digital asset to the recipient device. A data source and a network resource via which the data source is to provide the digital asset to the recipient device can be determined, where the data source and the network resource are capable of satisfying the delivery requirements. A ledger that includes instructions for constructing the digital asset at the recipient device can be provided to the recipient device. Delivery of the digital asset to the recipient device by the data source can be triggered, and delivery of the digital asset to the recipient device by the data source can be tracked using a token.

20 Claims, 8 Drawing Sheets

PROVIDING AND USING A DIGITAL ASSET DELIVERY SERVICE

CROSS-REFERENCE TO RELATED APPLICATIONS

This application is a continuation of and claims priority to U.S. patent application Ser. No. 17/974,587, entitled "Providing and Using a Digital Asset Delivery Service," filed Oct. 27, 2022, now U.S. Pat. No. 12,165,197, which is incorporated herein by reference in its entirety.

BACKGROUND

Delivery of data across networks to one or more recipients can be complicated in some instances. For example, where large files are shared with recipients, the transfer of the data can challenge some networks. Similarly, where data collections are made up of multiple pieces of data, the providing of data across networks can create challenges in terms of tracking and merging the data at one or more recipients or endpoints.

SUMMARY

The present disclosure is directed to providing and using a digital asset delivery service. A sending device, a transmitting device, or another device such as the user device can be configured (e.g., via execution of the digital asset delivery application) to select a digital asset that is to be shared and/or transmitted to one or more recipients such as the recipient device. In some embodiments the digital asset may be stored at the user device, while in some other embodiments the digital asset may be stored at one or more data sources. The user device can be configured to generate a digital asset delivery request that can specify the digital asset to be shared, delivery requirements (e.g., timing requirements, quality of service ("QoS") or class of service ("CoS") requirements, security requirements, digital rights management requirements, authentication requirements, geographic location requirements, and the like), and one or more recipients of the digital assets. The user device can be configured to send the digital asset delivery request to a digital asset delivery service at a server computer. In some embodiments the digital asset delivery request can include the digital asset, while in other embodiments the digital asset and/or components thereof may be stored at one or more data sources and therefore may be referenced by file addresses, web addresses, memory storage locations, or the like. It should be understood that this example is illustrative, and therefore should not be construed as being limiting in any way.

The digital asset delivery service can be configured to receive the digital asset delivery request, to identify the digital assets that are to be shared and one or more recipients (e.g., the recipient device) with which the digital asset is to be shared. The digital asset delivery service can be configured to identify one or more data sources that are to provide the digital asset to the one or more recipients and one or more network resources that are to be used for delivery of the digital asset (and/or components thereof) to the one or more recipients. In some embodiments, the digital asset delivery service can identify the one or more data sources and network resources via a bidding process in which the digital asset delivery service can trigger the delivery of a bid request to the data sources, evaluation of bids generated by the data sources in response to the bid request, and selection of data sources (e.g., associated with the winning bids) to provide the digital asset to the one or more recipients.

The digital asset delivery service can generate one or more commands that, when executed by the data sources, cause the data sources to effect delivery of the digital asset and/or components thereof to the one or more recipients. The digital asset delivery service also can be configured to generate a ledger that can be used by the recipients to construct or reconstruct the digital asset from one or more digital assets and/or components thereof and to provide the ledger to the recipients. In some embodiments, the digital asset delivery service also can effect delivery of one or more keys or tokens to the recipients by the server computer for tracking, security, authentication, and/or other purposes.

The recipients (e.g., the recipient device) can obtain the digital assets (or components thereof), the keys, and the ledger. The recipient device (or other recipients) can construct or reconstruct the digital asset (if provided in two or more portions) using the ledger and the received digital assets and/or components. Thus, embodiments of the concepts and technologies disclosed herein can effect delivery of a digital asset to a recipient such as the recipient device. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining a digital asset delivery request that identifies a digital asset that is to be provided to a recipient device, information that identifies the recipient device, and data that defines delivery requirements associated with providing the digital asset to the recipient device. The operations further can include determining, based on the digital asset delivery request, a data source that is to provide the digital asset to the recipient device and a network resource via which the data source is to provide the digital asset to the recipient device, where the identified data source and the identified network resource are determined to be capable of satisfying the delivery requirements. The operations also can include providing, to the recipient device, a ledger that can include instructions for constructing the digital asset at the recipient device. The operations also can include triggering delivery of the digital asset to the recipient device by the data source, and tracking, via a token, delivery of the digital asset to the recipient device by the data source.

In some embodiments, the delivery requirements can include a quality of service required for the network resource used to provide the digital asset to the recipient device; a time within which the digital asset must be provided to the recipient device; a security policy that applies to providing the digital asset to the recipient device; and a privacy policy that applies to providing the digital asset to the recipient device. In some embodiments, obtaining the digital asset delivery request can include receiving the digital asset delivery request from a user device that sends the digital asset delivery request via a network connection. In some embodiments, obtaining the digital asset delivery request can include obtaining the digital asset delivery request via a portal that is exposed to a user device via a network connection.

In some embodiments, determining the data source that is to provide the digital asset to the recipient device and the network resource via which the data source is to provide the digital asset to the recipient device can include generating a bid request that specifies the digital asset, the recipient device, and the delivery requirements; providing the bid request to two or more data sources including the data source; receiving, from the two or more data sources, two or more bids, each of the two or more bids proposing delivery of the digital asset to the recipient device via respective network resources; and evaluating the two or more bids to identify the data source, wherein the data source specifies in an associated bid of the two or more bids, delivery of the digital asset to the recipient device in a manner that satisfies the delivery requirements.

In some embodiments, the operations can also include receiving, as part of the digital asset delivery request, the token, where the token can be used to track delivery of the digital asset to the recipient device; and relaying, to the recipient device, the token. In some embodiments, the operations can also include receiving, as part of the digital asset delivery request, the token, where the token can be used to track delivery of the digital asset to the recipient device; and relaying, to the data source, the token, where the data source can deliver the token to the recipient device with the digital asset.

According to another aspect of the concepts and technologies disclosed herein, a method is disclosed. The method can include obtaining, at a server computer that includes a processor, a digital asset delivery request that identifies a digital asset that is to be provided to a recipient device, information that identifies the recipient device, and data that defines delivery requirements associated with providing the digital asset to the recipient device. The method further can include determining, by the processor and based on the digital asset delivery request, a data source that is to provide the digital asset to the recipient device and a network resource via which the data source is to provide the digital asset to the recipient device, where the identified data source and the identified network resource are determined to be capable of satisfying the delivery requirements. The method also can include providing, by the processor and to the recipient device, a ledger that can include instructions for constructing the digital asset at the recipient device. The method also can include triggering, by the processor, delivery of the digital asset to the recipient device by the data source, and tracking, by the processor and via a token, delivery of the digital asset to the recipient device by the data source.

In some embodiments, the delivery requirements can include a quality of service required for the network resource used to provide the digital asset to the recipient device; a time within which the digital asset must be provided to the recipient device; a security policy that applies to providing the digital asset to the recipient device; and a privacy policy that applies to providing the digital asset to the recipient device. In some embodiments, obtaining the digital asset delivery request can include receiving the digital asset delivery request from a user device that sends the digital asset delivery request via a network connection. In some embodiments, obtaining the digital asset delivery request can include obtaining the digital asset delivery request via a portal that is exposed to a user device via a network connection.

In some embodiments, determining the data source that is to provide the digital asset to the recipient device and the network resource via which the data source is to provide the digital asset to the recipient device can include generating a bid request that specifies the digital asset, the recipient device, and the delivery requirements; providing the bid request to two or more data sources including the data source; receiving, from the two or more data sources, two or more bids, each of the two or more bids proposing delivery of the digital asset to the recipient device via respective network resources; and evaluating the two or more bids to identify the data source, wherein the data source specifies in an associated bid of the two or more bids, delivery of the digital asset to the recipient device in a manner that satisfies the delivery requirements.

In some embodiments, the method can also include receiving, as part of the digital asset delivery request, the token, where the token can be used to track delivery of the digital asset to the recipient device; and relaying, to the recipient device, the token. In some embodiments, the method can also include receiving, as part of the digital asset delivery request, the token, where the token can be used to track delivery of the digital asset to the recipient device; and relaying, to the data source, the token, where the data source can deliver the token to the recipient device with the digital asset.

According to yet another aspect of the concepts and technologies disclosed herein, a computer storage medium is disclosed. The computer storage medium can store computer-executable instructions that, when executed by a processor, cause the processor to perform operations. The operations can include obtaining a digital asset delivery request that identifies a digital asset that is to be provided to a recipient device, information that identifies the recipient device, and data that defines delivery requirements associated with providing the digital asset to the recipient device. The operations further can include determining, based on the digital asset delivery request, a data source that is to provide the digital asset to the recipient device and a network resource via which the data source is to provide the digital asset to the recipient device, where the identified data source and the identified network resource are determined to be capable of satisfying the delivery requirements. The operations also can include providing, to the recipient device, a ledger that can include instructions for constructing the digital asset at the recipient device. The operations also can include triggering delivery of the digital asset to the recipient device by the data source, and tracking, via a token, delivery of the digital asset to the recipient device by the data source.

In some embodiments, the delivery requirements can include a quality of service required for the network resource used to provide the digital asset to the recipient device; a time within which the digital asset must be provided to the recipient device; a security policy that applies to providing the digital asset to the recipient device; and a privacy policy that applies to providing the digital asset to the recipient device. In some embodiments, obtaining the digital asset delivery request can include receiving the digital asset delivery request from a user device that sends the digital asset delivery request via a network connection. In some embodiments, obtaining the digital asset delivery request can include obtaining the digital asset delivery request via a portal that is exposed to a user device via a network connection.

In some embodiments, determining the data source that is to provide the digital asset to the recipient device and the network resource via which the data source is to provide the digital asset to the recipient device can include generating a bid request that specifies the digital asset, the recipient device, and the delivery requirements; providing the bid request to two or more data sources including the data source; receiving, from the two or more data sources, two or more bids, each of the two or more bids proposing delivery of the digital asset to the recipient device via respective network resources; and evaluating the two or more bids to identify the data source, wherein the data source specifies in an associated bid of the two or more bids, delivery of the digital asset to the recipient device in a manner that satisfies the delivery requirements.

In some embodiments, the operations can also include receiving, as part of the digital asset delivery request, the token, where the token can be used to track delivery of the digital asset to the recipient device; and relaying, to the recipient device, the token. In some embodiments, the operations can also include receiving, as part of the digital asset delivery request, the token, where the token can be used to track delivery of the digital asset to the recipient device; and relaying, to the data source, the token, where the data source can deliver the token to the recipient device with the digital asset.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
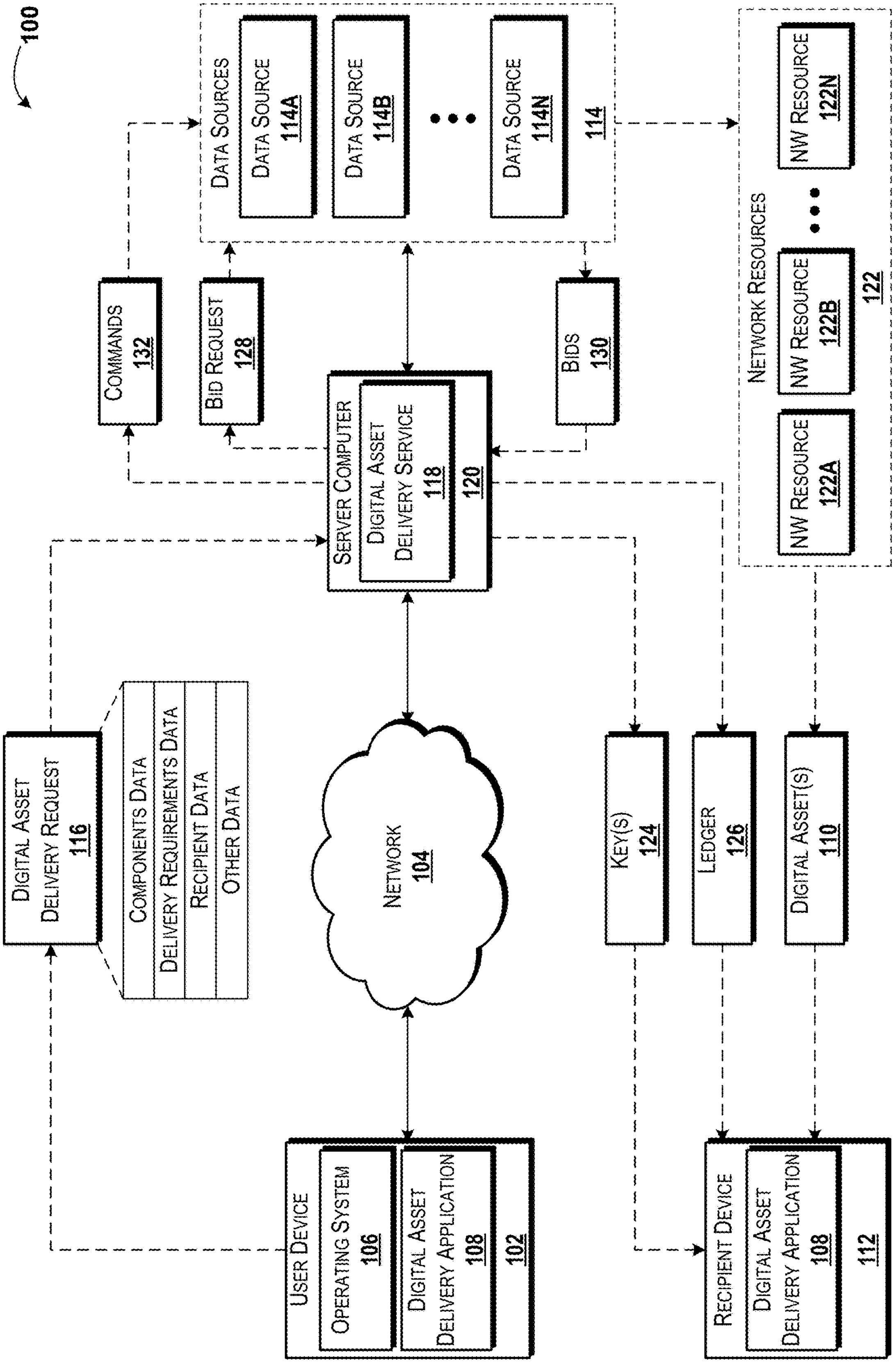
FIG. 1 is a system diagram illustrating an illustrative operating environment for various embodiments of the concepts and technologies described herein.

The following detailed description is directed to providing and using a digital asset delivery service. A sending device, a transmitting device, or another device such as the user device can be configured (e.g., via execution of the digital asset delivery application) to select a digital asset that is to be shared and/or transmitted to one or more recipients such as the recipient device. In some embodiments the digital asset may be stored at the user device, while in some other embodiments the digital asset may be stored at one or more data sources. The user device can be configured to generate a digital asset delivery request that can specify the digital asset to be shared, delivery requirements (e.g., timing requirements, QoS/CoS requirements, security requirements, digital rights management requirements, authentication requirements, geographic location requirements, and the like), and one or more recipients of the digital assets. The user device can be configured to send the digital asset delivery request to a digital asset delivery service at a server computer. In some embodiments the digital asset delivery request can include the digital asset, while in other embodiments the digital asset and/or components thereof may be stored at one or more data sources and therefore may be referenced by file addresses, web addresses, memory storage locations, or the like. It should be understood that this example is illustrative, and therefore should not be construed as being limiting in any way.

The digital asset delivery service can be configured to receive the digital asset delivery request, to identify the digital assets that are to be shared and one or more recipients (e.g., the recipient device) with which the digital asset is to be shared. The digital asset delivery service can be configured to identify one or more data sources that are to provide the digital asset to the one or more recipients and one or more network resources that are to be used for delivery of the digital asset (and/or components thereof) to the one or more recipients. In some embodiments, the digital asset delivery service can identify the one or more data sources and network resources via a bidding process in which the digital asset delivery service can trigger the delivery of a bid request to the data sources, evaluation of bids generated by the data sources in response to the bid request, and selection of data sources (e.g., associated with the winning bids) to provide the digital asset to the one or more recipients.

The digital asset delivery service can generate one or more commands that, when executed by the data sources, cause the data sources to effect delivery of the digital asset and/or components thereof to the one or more recipients. The digital asset delivery service also can be configured to generate a ledger that can be used by the recipients to construct or reconstruct the digital asset from one or more digital assets and/or components thereof and to provide the ledger to the recipients. In some embodiments, the digital asset delivery service also can effect delivery of one or more keys or tokens to the recipients by the server computer for tracking, security, authentication, and/or other purposes.

The recipients (e.g., the recipient device) can obtain the digital assets (or components thereof), the keys, and the ledger. The recipient device (or other recipients) can construct or reconstruct the digital asset (if provided in two or more portions) using the ledger and the received digital assets and/or components. Thus, embodiments of the concepts and technologies disclosed herein can effect delivery of a digital asset to a recipient such as the recipient device. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using a digital asset delivery service will be described, according to an illustrative embodiment. The operating environment 100 shown in FIG. 1 includes a user device 102. The user device 102 can operate in communication with and/or as part of a communications network ("network") 104, though this is not necessarily the case in all embodiments.

According to various embodiments, the functionality of the user device 102 may be provided by one or more server computers, desktop computers, mobile telephones, laptop computers, set-top boxes, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a personal computer or a smartphone. It should be understood that this embodiment is illustrative, and should not be construed as being limiting in any way.

The user device 102 can execute an operating system 106 and one or more application programs such as, for example, a digital asset delivery application 108. The operating system 106 can include a computer program that can control the operation of the user device 102. The digital asset delivery application 108 can include an executable program that can be configured to execute on top of the operating system 106 to provide various functions as illustrated and described herein.

The digital asset delivery application 108 can be configured to request delivery of one or more digital assets 110 to one or more recipients such as, for example, a recipient device 112. As illustrated in FIG. 1, the recipient device 112 can also be configured to host and/or execute the digital asset delivery application 108. As such, it can be appreciated that the user device 102 and the recipient device 112 can be interchangeable with one another, in some embodiments. For example, the recipient device 112 can be configured in some embodiments to request delivery of one or more digital assets 110 to the user device 102. As such, it should be understood that the illustrated embodiment is illustrative and should not be construed as being limiting in any way.

According to various embodiments of the concepts and technologies disclosed herein, the digital assets 110 can include various types of data, data files, and/or components or portions of data and/or data files. In various embodiments of the concepts and technologies disclosed herein, the digital assets 110 can be stored at and/or obtained from one or more data sources 114A-N(hereinafter collectively and/or generically referred to as "data sources 114") and/or the user device 102. The data sources 114 can include, for example, any source of data such as video servers or services, audio servers or services, data repositories and/or servers, computing devices, social networking servers or services, and/or other data storage and/or data hosting devices. Because various data storage services and/or devices are possible and are contemplated, it should be understood that these examples are illustrative, and therefore should not be construed as being limiting in any way.

According to various embodiments of the concepts and technologies disclosed herein, the digital asset delivery application 108 can be executed by the user device 102 to identify the digital assets 110 that are to be shared with one or more recipients (e.g., the recipient device 112) and the identity of the one or more recipients (e.g., the recipient device 112). The digital asset delivery application 108 can be configured to generate a digital asset delivery request 116. The digital asset delivery request 116 can be designed to trigger delivery of the one or more digital assets 110 the one or more recipients (e.g., the recipient device 112). According to various embodiments of the concepts and technologies disclosed herein, the digital asset delivery request 116 can include components data, delivery requirements data, recipient data, and other data. It should be understood that this example is illustrative, and therefore should not be construed as being limiting in any way. The digital asset delivery request 116 can be sent, in various embodiments, by the user device 102 to a digital asset delivery service 118, which can be hosted and/or executed by a computing device such as, for example, a server computer 120. The functionality of the digital asset delivery service 118 will be explained in more detail below.

The components data of the digital asset delivery request 116 can include data that can identify one or more digital assets 110 and/or digital asset components that are to be provided to one or more recipients. In particular, in various embodiments of the concepts and technologies disclosed herein, the digital asset 110 can be provided in two or more digital asset components (e.g., portions of the digital asset 110). In some other embodiments, the digital asset 110 can be provided as part of a collection of data. In yet other embodiments, a single digital asset 110 may be provided in some embodiments. Thus, the components data of the digital asset delivery request 116 can identify one digital asset 110 that is to be provided to one or more recipients, two or more digital assets 110 that are to be provided to one or more recipients, and/or two or more digital asset components (or portions) that are to be provided to one or more recipients. Thus, the components data of the digital asset delivery request 116 can identify digital assets 110 or components thereof in various embodiments.

In various embodiments, the components data can identify a digital asset 110, a file or storage location (e.g., a URL, URI, file storage location, memory location, or the like) at which the digital asset 110 is located, two or more digital asset components, a file location at which the digital asset components are located, or the like. In some other embodiments, the components data of the digital asset delivery request 116 can include part of the digital asset 110 itself (e.g., the digital asset 110 can be transmitted in some embodiments of the concepts and technologies disclosed herein via the server computer 120 from the user device 102 to the recipient device 112). Because the components data of the digital asset delivery request 116 can include other data that corresponds to and/or identifies the digital asset 110 and/or components thereof, it should be understood that these examples are illustrative, and therefore should not be construed as being limiting in any way.

The delivery requirements data of the digital asset delivery request 116 can include data that identifies or specifies one or more delivery requirements associated with the delivery of the digital asset 110 and/or components thereof. For example, some embodiments of the concepts and technologies disclosed herein can include digital assets 110 that the delivery thereof requires specific security, digital rights management, and/or authentication technologies. Similarly, in some embodiments the delivery of a particular digital asset 110 may be required to occur at specified levels of CoS and/or QoS such as network speed, network latency, network priority, delivery time, or the like.

In yet other embodiments of the concepts and technologies disclosed herein, the delivery of a digital asset 110 may be required (e.g., by a data owner, by an operator associated with the digital asset delivery service 118, by other entities, or the like) to occur via one or more selected network resources 122A-N(hereinafter collectively and/or generically referred to as "network resources 122") and/or other portions of a network 104. In yet other embodiments of the concepts and technologies disclosed herein, the delivery of a digital asset 110 may be required to occur in, within, to, and/or from specific geographic locations. In yet other embodiments of the concepts and technologies disclosed herein, the delivery of a digital asset 110 may be required to occur within a specified timeframe or time.

Thus, the delivery requirements data of the digital asset delivery request 116 can specify these and/or any other delivery requirements. Because other delivery requirements are illustrated and described herein, it should be understood that these examples are illustrative, and therefore should not be construed as being limiting in any way.

The recipient data of the digital asset delivery request 116 can include data that identifies one or more recipients (e.g., the recipient device 112) of the digital asset 110. Thus, the recipient data of the digital asset delivery request 116 can include a list of devices or users that are to receive the digital asset 110, with the users or devices being identified by logins, device identifiers (e.g., an international mobile subscriber identity ("IMSI"), an international mobile equipment identity ("IMEI"), a media access control ("MAC") address, an Internet Protocol ("IP") address, a uniform resource locator ("URL"), a uniform resource identifier ("URI"), or the like), or other identifiers. Because the recipients of the digital asset 110 can be identified in additional and/or alternative manners (e.g., a user may create an account with numerous devices and can select a device from a list in some embodiments), it should be understood that these examples are illustrative, and therefore should not be construed as being limiting in any way.

The other data of the digital asset delivery request 116 can include other data associated with the digital asset delivery request 116 such as a sender or sending device (e.g., the user device 102), a time associated with the digital asset delivery request 116, authorizations associated with the delivery of the digital asset 110 and/or the digital asset 110, digital rights management information associated with the digital asset 110 and/or content or components thereof, tokens used for tracking delivery of the digital asset 110 (e.g., a token can be provided in the digital asset delivery request 116 and then used by the server computer 120 to track delivery of the digital asset 110 by relaying the token to the recipient as or with one or more keys 124 and/or by relaying the token to a data source 114 for inclusion in the digital asset 110 or component when delivered to the recipient(s)), or the like. Because other data illustrated and described herein can be included in the other data of the digital asset delivery request 116 in various embodiments of the concepts and technologies disclosed herein, it should be understood that these examples are illustrative, and therefore should not be construed as being limiting in any way.

The digital asset delivery service 118 can be configured to receive the digital asset delivery request 116 and identify one or more digital assets 110 and/or components thereof that are to be provided to the one or more recipients (e.g., the recipient device 112). The digital asset delivery service 118 also can be configured to determine, based on the components data, delivery requirements data, recipient data, and/or other data of the digital asset delivery request 116; which of the data sources 114 is to provide the digital asset 110 and/or components thereof; as well as which of the network resources 122 are to be used to transmit the digital asset 110 and/or components thereof. Additionally, as will be explained in more detail below, the digital asset delivery service 118 can be configured to generate a ledger 126 that can provide instructions for constructing or reconstructing the digital asset 110 from two or more digital asset components in some embodiments. It should be understood that this example is illustrative, and therefore should not be construed as being limiting in any way.

More particularly, in some embodiments of the concepts and technologies disclosed herein a particular digital asset 110 may need to be delivered in a certain time, at a certain speed and/or QoS commitment, via and/or at a particular geographic location, while meeting certain privacy and/or security requirements, or the like. In some embodiments, the security requirements and/or policy requirements can be defined by a security policy and/or a privacy policy that can specify encryption to be used, detection of third party access, data obfuscation, and/or other policies that apply to the delivery of the digital asset 110. These and/or other delivery requirements may be used by the digital asset delivery service 118 to identify the one or more data sources 114 that are to provide the digital asset 110 and/or what network resources 122 are to be used for transport of the digital asset 110 (e.g., while complying with the delivery requirements specified in the digital asset delivery request 116). In some embodiments the digital asset delivery service 118 can identify the data sources 114 and the network resources 122 based on network data and/or topology data (or the like).

In some other embodiments, the digital asset delivery service 118 can be configured to create a bid request 128 that can request a bid 130 from one or more data sources 114 for delivery of the specified digital assets 110 or components thereof to the specified one or more recipients (e.g., the recipient device 112) while meeting the specified delivery requirements. One or more of the data sources 114 can respond to the bid request 128 with a bid 130 that indicates if the data source 114 can provide the digital asset 110 or component thereof in the specified timeframe, with the specified QoS or CoS, while meeting the various delivery requirements, etc. It can be appreciated that the data sources 114 can, as part of the bidding process if performed, identify the one or more network resources 122 that will be used to provide the digital asset 110 or component thereof to the one or more recipients (e.g., the recipient device 112) in accordance with the specified delivery requirements. In some embodiments of the concepts and technologies disclosed herein, the bids 130 can identify the network resources 122 that would be used by a particular data source 114 and the digital asset delivery service 118 can evaluate that information as well as part of a bid evaluation process to ensure that the delivery requirements will be met. It should be understood that this example is illustrative, and therefore should not be construed as being limiting in any way.

The digital asset delivery service 118 can evaluate the bids 130 (if provided) and select one or more of the data sources 114 to deliver the digital asset 110 and/or component thereof based on the bids 130. In some embodiments, the digital asset delivery service 118 can be configured to generate one or more commands 132. The commands 132 can include computer-executable instructions that, when executed by the data source 114, can cause the data source 114 to send the digital asset 110 or component thereof to the one or more recipients (e.g., the recipient device 112). At some time, either by way of delivering the commands 132 to the data sources 114 and/or at other times, the digital asset delivery service 118 can cause the data sources 114 to effect or trigger delivery of the digital asset 110 to the one or more recipients (e.g., the recipient device 112). It should be understood that this example is illustrative, and therefore should not be construed as being limiting in any way.

The digital assets 110 and/or components thereof can be delivered to the one or more recipients (e.g., the recipient device 112) by the one or more data sources 114. The digital asset delivery service 118 can create the ledger 126 and the ledger 126 can be delivered by the server computer 120 to the one or more recipients (e.g., the recipient device 112) by the server computer 120. In some embodiments, as noted above, the server computer 120 also can be configured (e.g., via execution of the digital asset delivery service 118) to provide one or more keys 124 to the one or more recipients and/or to pass tokens for tracking and/or other purposes. It should be understood that this example is illustrative, and therefore should not be construed as being limiting in any way.

The one or more recipients (e.g., the recipient device 112) can obtain the digital assets 110 (or components thereof), the keys 124 (if provided), and the ledger 126 (if used). The recipient device 112 can be configured (e.g., via execution of the digital asset delivery application 108) to construct and/or reconstruct the digital asset 110 using the ledger 126. Thus, embodiments of the concepts and technologies disclosed herein can be used to provide the digital asset 110 to the recipient device 112. It should be understood that this example is illustrative, and therefore should not be construed as being limiting in any way.

It should be understood that embodiments of the concepts and technologies disclosed herein can include providing a digital asset 110 from one or more user devices 102 to one or more recipient devices 112. As such, the illustrated embodiment of FIG. 1, which is illustrated as including one user device 102 and one recipient device 112 is illustrative of a one simplified embodiment used for illustration purposes. As such, the illustrated embodiment should not be construed as being limiting in any way.

In practice, a sending device, transmitting device, or other device such as the user device 102 can be configured (e.g., via execution of the digital asset delivery application 108) to select a digital asset 110 that is to be shared and/or transmitted to one or more recipients such as the recipient device 112. The user device 102 can be configured to generate a digital asset delivery request 116 that can specify the digital asset 110 to be shared, delivery requirements (e.g., timing requirements, QoS/CoS requirements, security requirements, digital rights management requirements, authentication requirements, geographic location requirements, and the like), and one or more recipients of the digital assets 110. The user device 102 can be configured to send the digital asset delivery request 116 to a digital asset delivery service 118 at a server computer 120. In some embodiments the digital asset delivery request 116 can include the digital asset 110, while in other embodiments the digital asset 110 and/or components thereof may be stored at one or more data sources 114. It should be understood that this example is illustrative, and therefore should not be construed as being limiting in any way.

The digital asset delivery service 118 can be configured to receive the digital asset delivery request 116, to identify the digital assets 110 that are to be shared and one or more recipients (e.g., the recipient device 112) with which the digital asset 110 is to be shared. The digital asset delivery service 118 can be configured to identify one or more data sources 114 that are to provide the digital asset 110 to the one or more recipients and one or more network resources 122 that are to be used for delivery of the digital asset 110 (and/or components thereof) to the one or more recipients. In some embodiments, the digital asset delivery service 118 can identify the one or more data sources 114 and network resources 122 via a bidding process in which the digital asset delivery service 118 can trigger the delivery of a bid request 128 to the data sources 114, evaluation of bids 130 generated by the data sources 114 in response to the bid request 128, and selection of data sources 114 (e.g., associated with the winning bids 130) to provide the digital asset 110 to the one or more recipients.

The digital asset delivery service 118 can generate one or more commands 132 that, when executed by the data sources 114, cause the data sources 114 to effect delivery of the digital asset 110 and/or components thereof to the one or more recipients. The digital asset delivery service 118 also can be configured to generate a ledger 126 that can be used by the recipients to construct or reconstruct the digital asset 110 from one or more digital assets 110 and/or components thereof and to provide the ledger 126 to the recipients. In some embodiments, the digital asset delivery service 118 also can effect delivery of one or more keys or tokens to the recipients by the server computer 120 for tracking, security, authentication, and/or other purposes.

The recipients (e.g., the recipient device 112) can obtain the digital assets 110 (or components thereof), the keys 124, and the ledger 126. The recipient device 112 (or other recipients) can construct or reconstruct the digital asset 110 (if provided in two or more portions) using the ledger 126 and the received digital assets 110 and/or components. Thus, embodiments of the concepts and technologies disclosed herein can effect delivery of a digital asset 110 to a recipient such as the recipient device 112. It should be understood that this example is illustrative, and therefore should not be construed as being limiting in any way.

FIG. 1 illustrates one user device 102, one network 104, one server computer 120, three data sources 114, and one recipient device 112. It should be understood, however, that various implementations of the operating environment 100 can include one or more than one user device 102; one or more than one network 104; one or more than one server computer 120; one, two, three, or more than three data sources 114; and/or one or more than one recipient device 112. As such, the illustrated embodiment should be understood as being illustrative, and should not be construed as being limiting in any way.

Figure 2:
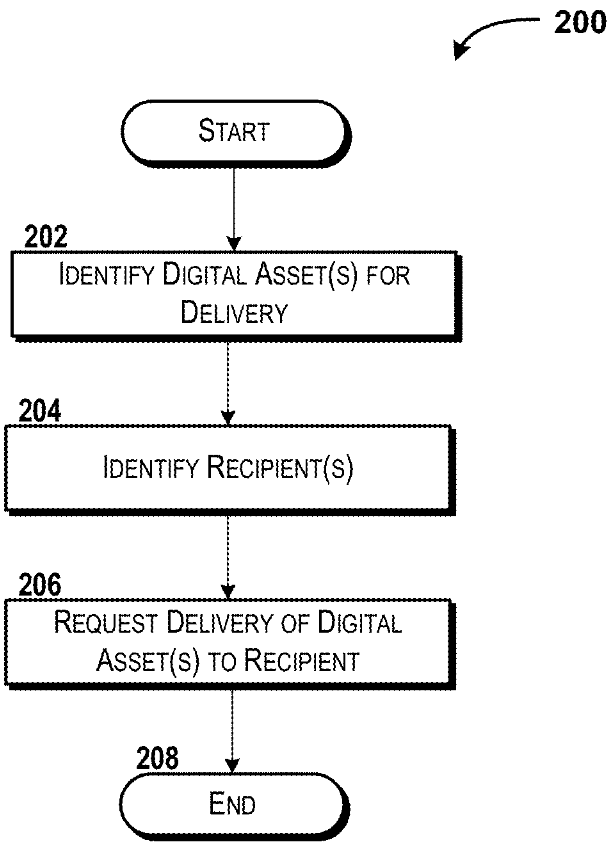
FIG. 2 is a flow diagram showing aspects of a method for requesting delivery of digital assets to a recipient device, according to an illustrative embodiment of the concepts and technologies described herein.

Turning now to FIG. 2, aspects of a method 200 for requesting delivery of digital assets 110 to a recipient device 112 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, to perform one or more operations and/or causing the processor to direct other components of the computing system or device to perform one or more of the operations.

For purposes of illustrating and describing the concepts of the present disclosure, the method 200 is described herein as being performed by the user device 102 via execution of one or more software modules such as, for example, the digital asset delivery application 108. It should be understood that additional and/or alternative devices and/or network nodes can provide the functionality described herein via execution of one or more modules, applications, and/or other software including, but not limited to, the digital asset delivery application 108. Thus, the illustrated embodiments are illustrative, and should not be viewed as being limiting in any way.

The method 200 begins at operation 202. At operation 202, the user device 102 can identify one or more digital asset 110 for delivery. According to various embodiments of the concepts and technologies disclosed herein, the digital asset 110 can include a single digital asset such as a file, a stream, an application, or the like. In some other embodiments, the digital asset 110 can correspond to a collection of multiple digital assets such as files, streams, applications, or the like. In either and/or both cases, the user device 102 may wish to transfer the digital asset 110 to a recipient such as the recipient device 112, while in some other embodiments, the user device 102 may not be in possession of the one or more digital assets 110. In some embodiments, as noted herein, the user device 102 may wish to have the one or more digital assets 110 sent to the recipient such as the recipient device 112 from one or more data sources 114.

For example, the user device 102 may wish for an audiovisual work to be constructed at the recipient device 112. To accomplish this goal, the user device 102 can create a digital asset delivery request 116 that requests sending of one or more digital assets 110 (and/or components thereof in some embodiments) to the recipient device 112 with any keys 124 and/or a ledger 126 that may be used to construct the audiovisual work. In this embodiment, the audio files, the video files, and other data that will be used to construct the audiovisual work can correspond to the one or more digital assets 110. It should be understood that this example is illustrative, and therefore should not be construed as being limiting in any way.

As explained herein, the digital asset delivery service 118 can coordinate the sending of the one or more digital assets 110 (or components thereof) that will be used to construct the audiovisual work to the recipient device 112, as well as the obtaining of keys 124 and/or construction and/or sharing of a ledger 126 with the recipient device 112 for purposes of reconstructing the audiovisual work. As such, it can be appreciated that operation 202 can include the user device 102 identifying what digital assets 110 are to be sent to the recipient (e.g., the recipient device 112) and, of course, an identity of the recipient device 112. Because the digital assets 110 can be identified in additional and/or alternative manners, it should be understood that this example is illustrative, and therefore should not be construed as being limiting in any way.

From operation 202, the method 200 can proceed to operation 204. At operation 204, the user device 102 can identify one or more recipients for the digital asset 110 such as, for example, the recipient device 112. As noted above, the user device 102 can identify what (e.g., which digital assets 110) are to be shared with a recipient such as the recipient device 112, and in operation 204 the user device 102 can identify the recipient (e.g., the recipient device 112). According to various embodiments of the concepts and technologies disclosed herein, the user device 102 can identify the recipient device 112 by various types of identifying information such as an IMSI, an IMEI, a MAC address, an IP address, a URL, a URI, a stream location, a file location, a user name, a user login, and/or other identifying information associated with the recipient device 112, a user of the recipient device 112, or the like. In some embodiments of the concepts and technologies disclosed herein, the user device 102 and the recipient device 112 can be owned and/or controlled by a particular user and various devices can be selected from a list of recipients presented to the user at the user device 102. Because the one or more recipients can be identified in additional and/or alternative manners, it should be understood that this example is illustrative, and therefore should not be construed as being limiting in any way.

From operation 204, the method 200 can proceed to operation 206. At operation 206, the user device 102 can request delivery of the digital assets 110 to the one or more recipient device 112. As the user device 102 will have identified, in operation 202, the digital asset 110 to be shared or delivered with a recipient; and identified, in operation 204, the recipient device 112 that will receive the digital asset 110, operation 206 can correspond to the user device 102 formally requesting transfer of the digital asset 110 and/or triggering delivery of the digital asset 110 to the recipient device 112. Thus, operation 206 can include, for example, the user device 102 generating the digital asset delivery request 116, which as noted above can include information that identifies components (e.g., data components) of the digital asset 110, information that identifies one or more recipients of the digital asset 110, information that specifies delivery requirements for the digital assets 110, etc.

In operation 206, the user device 102 can generate the digital asset delivery request 116 and send the digital asset delivery request 116 to the server computer 120 for processing by the digital asset delivery service 118. Because in some embodiments the digital asset delivery request 116 can be generated via an application programming interface ("API"), a portal, a service call, or the like, it should be understood that the digital asset delivery request 116 may be generated at the server computer 120 in some embodiments and therefore may not be transmitted to the server computer 120 per se in some embodiments. It should be understood that this example is illustrative, and therefore should not be construed as being limiting in any way.

From operation 206, the method 200 can proceed to operation 208. The method 200 can end at operation 208.

Figure 3:
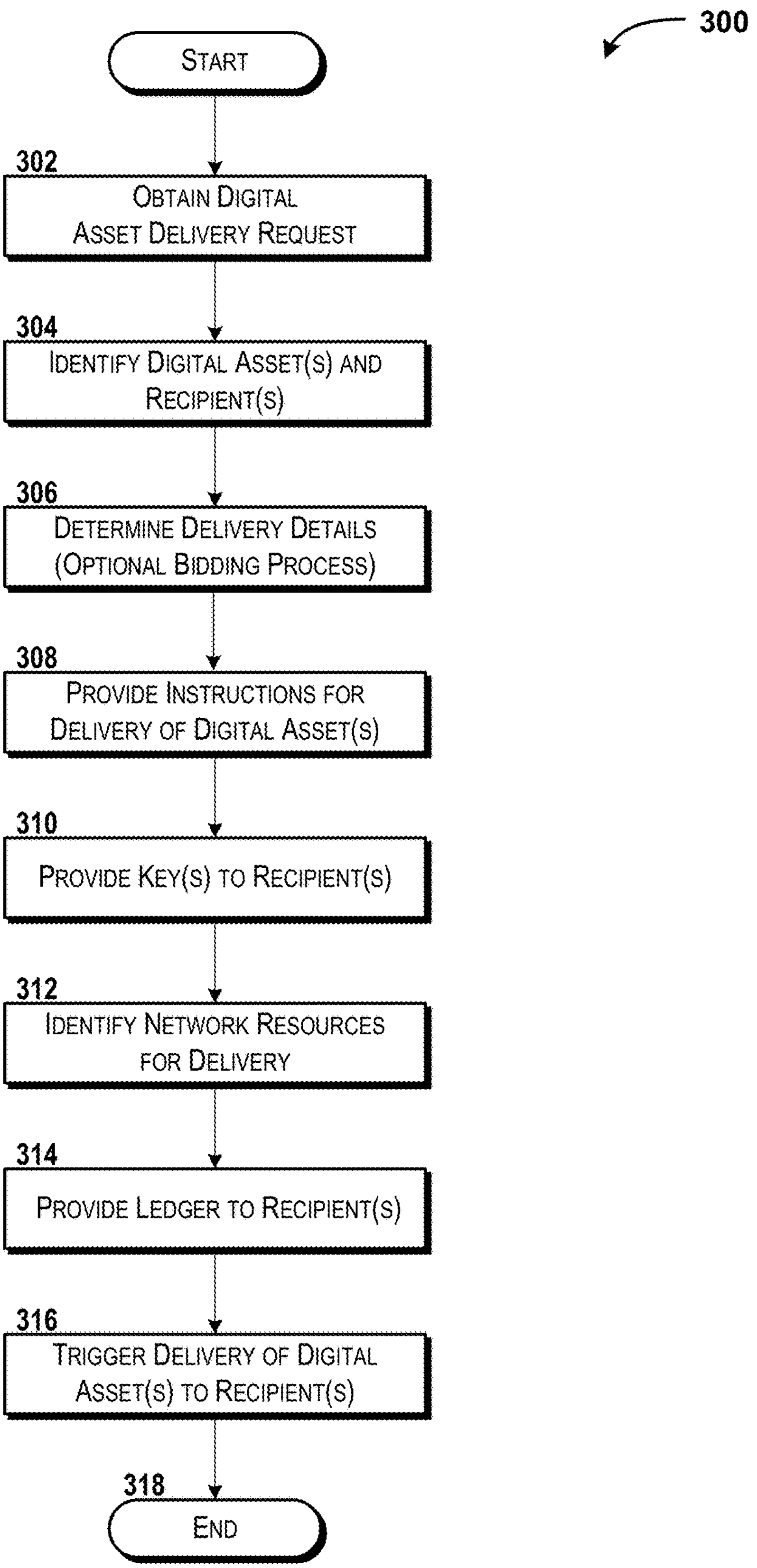
FIG. 3 is a flow diagram showing aspects of a method for delivering digital assets to a recipient device, according to an illustrative embodiment of the concepts and technologies described herein.

Turning now to FIG. 3, aspects of a method 300 for delivering digital assets to a recipient device will be described in detail, according to an illustrative embodiment. For purposes of illustrating and describing the concepts of the present disclosure, the method 300 is described herein as being performed by the server computer 120 via execution of one or more software modules such as, for example, the digital asset delivery service 118. It should be understood that additional and/or alternative devices and/or network nodes can provide the functionality described herein via execution of one or more modules, applications, and/or other software including, but not limited to, the digital asset delivery service 118. Thus, the illustrated embodiments are illustrative, and should not be viewed as being limiting in any way.

The method 300 begins at operation 302. At operation 302, the server computer 120 can receive or otherwise obtain a digital asset delivery request 116. In various embodiments of the concepts and technologies disclosed herein, as noted above, the user device 102 can send the digital asset delivery request 116 to the server computer 120 via one or more network connections. In some other embodiments, the user device 102 can create the digital asset delivery request 116 via a portal or API exposed by the server computer 120 and therefore the server computer 120 may not receive the digital asset delivery request 116 per se (as it may be created at the server computer 120). Thus, operation 302 includes the digital asset delivery request 116 being created at the server computer 120 and/or received at the server computer 120. Because the server computer 120 can determine that a digital asset 110 is to be delivered to one or more recipients in additional and/or alternative manners (e.g., the illustrated embodiment of the digital asset delivery request 116 is not required in all embodiments), it should be understood that this example is illustrative, and therefore should not be construed as being limiting in any way.

From operation 302, the method 300 can proceed to operation 304. At operation 304, the server computer 120 can identify one or more digital assets 110 and one or more recipients. The identity of the digital assets 110 and the recipients can be included in the digital asset delivery request 116, as explained above with reference to FIGS. 1-2, and therefore operation 304 can include the server computer 120 extracting this information from the digital asset delivery request 116. Because the identities of the one or more digital assets 110 and the one or more recipients can be determined in additional and/or alternative manners, it should be understood that this example is illustrative, and therefore should not be construed as being limiting in any way.

From operation 304, the method 300 can proceed to operation 306. At operation 306, the server computer 120 can determine delivery details for each digital asset 110. According to various embodiments of the concepts and technologies disclosed herein, the server computer 120 can determine one or more data sources 114 that host or store the digital assets 110 and/or components thereof. It can be appreciated that in some embodiments of the concepts and technologies disclosed herein, the digital asset 110 may initially be stored at the user device 102 as well, so operation 306 can include identifying the one or more data sources 114 and/or the user device 102 as being in possession of the digital asset 110 that is to be shared and/or one or more components thereof.

In addition to identifying where the digital assets 110 are stored, the server computer 120 can further determine in operation 306 how the digital asset 110 will be shared with the one or more recipients. In particular, one or more digital assets 110 and/or components thereof can have varied delivery requirements. For example, digital video files may in some embodiments require encryption and/or various other rights management technologies for data transfer of the data while some other data (e.g., photographs) may not require such encryption or other rights management technologies. Embodiments of the concepts and technologies disclosed herein include the server computer 120 determining, for each of the one or more digital assets 110 and/or components thereof that are to be shared, delivery requirements for those digital assets 110 and/or components thereof such as security protocols that are to be used, rights management technologies that may be used (e.g., tokens, authorizations, etc.), network requirements (e.g., network speed requirements, network security requirements, network QoS/CoS requirements, etc.), or the like. Thus, operation 306 can include the server computer 120 determining the delivery requirements for each digital asset 110 and/or components thereof.

Furthermore, the server computer 120 can be configured to host and/or provide a bidding system for delivery of the digital assets 110 and/or components thereof in some embodiments. For example, the server computer 120 can be configured to notify one or more of the data sources 114 that a particular digital asset 110 (or component thereof) is to be shared with one or more recipient and the delivery requirements for that sharing with a request for bids, e.g., a bid request 128. The one or more data sources 114 can be configured to respond to the bid request 128 with one or more bids 130, each of the bids 130 including indications of an ability of a particular data source 114 to fulfill the requested delivery of the digital asset 110 (e.g., a speed with which the digital asset 110 can be delivered; a QoS that can be met for the delivery, network resources 122 that are to be used for the delivery, a security level that can be met for the delivery, etc.). The server computer 120 can evaluate the bids 130 and grant the delivery of the digital asset 110 to the one or more data sources 114 associated with the one or more winning bids 130. Because the data sources 114 that are to deliver the digital assets 110 can be identified in additional and/or alternative manners (e.g., without bidding), it should be understood that this example is illustrative, and therefore should not be construed as being limiting in any way.

From operation 306, the method 300 can proceed to operation 308. At operation 308, the server computer 120 can generate instructions for delivery of the one or more digital assets 110 to the one or more recipients. Thus, operation 308 can correspond to the server computer 120 generating one or more commands 132 to the one or more data sources 114. Each of the commands 132, as noted above, can specify the data source 114 that is to deliver the digital asset 110 (or component thereof), one or more recipients of the digital asset 110 (or component thereof), and any requirements that are specified for the delivery (e.g., security protocols, QoS, speed, etc.). Operation 308 can also include the server computer 120 delivering the one or more commands 132 to the one or more data sources 114. Because the server computer 120 can order or trigger delivery of the digital assets 110 to the one or more recipients in additional and/or alternative manners (e.g., without the use of commands 132 per se), it should be understood that this example is illustrative, and therefore should not be construed as being limiting in any way.

From operation 308, the method 300 can proceed to operation 310. At operation 310, the server computer 120 can obtain and deliver one or more keys 124 to the one or more recipients. As explained herein, some embodiments of the concepts and technologies disclosed herein can require tokens, keys, and/or other rights management and/or authentication technologies that may be required for the recipient device 112 to access the digital assets 110. Thus, operation 310 can include the server computer 120 identifying, obtaining (e.g., accessing, retrieving, or generating) the keys 124, and sending (or triggering the sending of) the keys 124 to the one or more recipients (e.g., the recipient device 112). Because the keys 124 can be obtained and/or delivered in additional and/or alternative manners, it should be understood that this example is illustrative, and therefore should not be construed as being limiting in any way.

From operation 310, the method 300 can proceed to operation 312. At operation 312, the server computer 120 can identify network resources 122 that are to be used for delivering the one or more digital assets 110 to the one or more recipients (e.g., the recipient device 112). Operation 312, it can be appreciated, can include identifying one or more paths (e.g., network communication paths through various network devices) for delivery of the digital assets 110; one or more delivery tracking technologies that may be used to track the sending of the digital assets 110 (if tracking is used); one or more security protocols and/or security resources that are to be used for delivery of the digital asset 110 (e.g., in some embodiments a recipient may be required to authenticate with an authentication, authorization and accounting ("AAA") server, application, or service before accessing the digital asset 110); keys and/or other rights management and/or security technologies that may be used for the digital asset 110 delivery and/or use; and the like.

It can be appreciated that in some embodiments of the concepts and technologies disclosed herein, the functionality illustrated and described herein with respect to operation 312 can be incorporated into operation 306 and/or other operations (e.g., as part of the bidding process, etc.). As such, it should be understood that the illustrated embodiment of the method 300 including operation 312 is illustrative of one contemplated embodiment and therefore should not be construed as being limiting in any way.

From operation 312, the method 300 can proceed to operation 314. At operation 314, the server computer 120 can generate and deliver a ledger 126 to the one or more recipients. According to various embodiments of the concepts and technologies disclosed herein, the digital asset 110 can be provided to the recipients in in one or more components or portions. Thus, the server computer 120 can be configured to generate a ledger 126 in some embodiments, the ledger 126 defining how the recipient device 112 (or other recipient) is to construct a file or data collection based on the delivered digital assets 110 and/or components thereof.

Thus, it can be appreciated that the ledger 126 can define how to construct or reconstruct two or more digital asset components into a digital asset 110. Thus, operation 314 can include the server computer 120 generating the ledger 126 (as the server computer 120 knows what components are used to create the digital asset 110 the server computer 120 can create the ledger 126) and delivering the ledger 126 to the one or more recipients (e.g., the recipient device 112). It can be appreciated that the digital asset delivery application 108 executed by the recipient device 112 can be configured to construct the digital asset 110 from the two or more digital asset components using the ledger 126. It should be understood that this example is illustrative, and therefore should not be construed as being limiting in any way.

From operation 314, the method 300 can proceed to operation 316. At operation 316, the server computer 120 can trigger delivery of the digital assets 110 to the one or more recipients. As explained above, the server computer 120 can be configured to order the delivery of the one or more digital assets 110 (or components thereof) by sending commands 132 to the data sources 114 and/or in other manners (e.g., instructing the recipient device 112 to access a file location, etc.). Thus, operation 316 can correspond to the server computer 120 indicating that the delivery should commence. Thus, it can be appreciated that operation 316 can be omitted in various embodiments of the concepts and technologies disclosed herein and/or can correspond to various operations that may be performed to effect delivery of the digital assets 110. As such, it should be understood that the illustrated embodiment is illustrative and should not be construed as being limiting in any way.

From operation 316, the method 300 can proceed to operation 318. The method 300 can end at operation 318.

Figure 4:
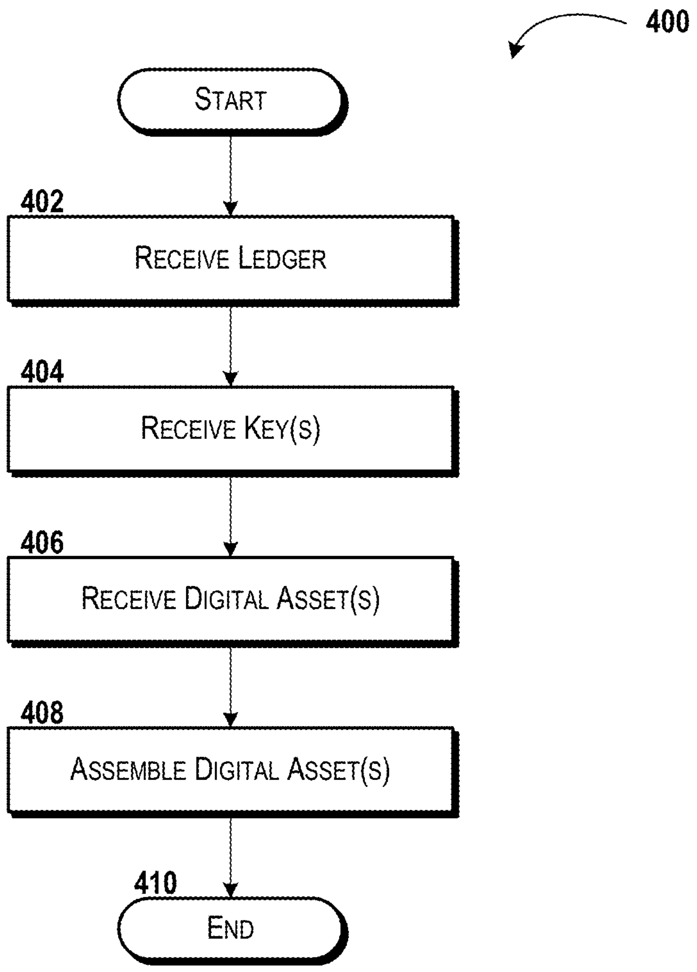
FIG. 4 is a flow diagram showing aspects of a method for obtaining digital assets at a recipient device, according to an illustrative embodiment of the concepts and technologies described herein.

Turning now to FIG. 4, aspects of a method 400 for obtaining digital assets at a recipient device will be described in detail, according to an illustrative embodiment. For purposes of illustrating and describing the concepts of the present disclosure, the method 400 is described herein as being performed by the recipient device 112 via execution of one or more software modules such as, for example, the digital asset delivery application 108. It should be understood that additional and/or alternative devices and/or network nodes can provide the functionality described herein via execution of one or more modules, applications, and/or other software including, but not limited to, the digital asset delivery application 108. Thus, the illustrated embodiments are illustrative, and should not be viewed as being limiting in any way.

The method 400 begins at operation 402. At operation 402, the recipient device 112 can receive a ledger 126. As explained above, the ledger 126 can include instructions for constructing and/or reconstructing a digital asset 110. Thus, the ledger 126 can include data that identifies two or more components of the digital asset 110, and instructions for combining those two or more components to create the digital asset 110. In the example provided above for an audiovisual project, the ledger 126 can include data that identifies the audio files for the audiovisual project (e.g., audio data from a first data source 114A), video files for the audiovisual project (e.g., video data from a second data source 114B), and other information such as digital rights technologies and/or requirements (e.g., authentication, tokens, and/or keys that may be required), or the like. Thus, the ledger 126 can be used by the recipient device 112 to obtain and combine two or more digital asset components to obtain the digital asset 110. It should be understood that this example is illustrative, and therefore should not be construed as being limiting in any way.

From operation 402, the method 400 can proceed to operation 404. At operation 404, the recipient device 112 can receive one or more keys 124. As explained above, the keys 124 can be used for authentication purposes, data tracking purposes (e.g., to track delivery of the digital asset 110 and/or digital asset component), and/or other purposes. Because keys 124 may be provided for other reasons, and/or may not be provided at all in some embodiments, it should be understood that the illustrated embodiment of operation 404 is illustrative and should not be construed as being limiting in any way.

From operation 404, the method 400 can proceed to operation 406. At operation 406, the recipient device 112 can receive one or more digital assets 110. It can be appreciated that operation 406 can correspond to the recipient device 112 receiving, from the one or more data sources 114 and/or the user device 102, the one or more digital assets 110 and/or two or more digital asset components. From operation 406, the method 400 can proceed to operation 408. At operation 408, the recipient device 112 can assemble the one or more digital assets 110. As explained above, the recipient device 112 can use the ledger 126 in some embodiments to construct the two or more digital asset components to obtain the digital assets 110. In some other embodiments, the recipient device 112 can assemble two or more digital assets 110 to obtain a collection of digital assets 110. It should be understood that these examples are illustrative, and therefore should not be construed as being limiting in any way.

From operation 408, the method 400 can proceed to operation 410. The method 400 can end at operation 410.

Figure 5:
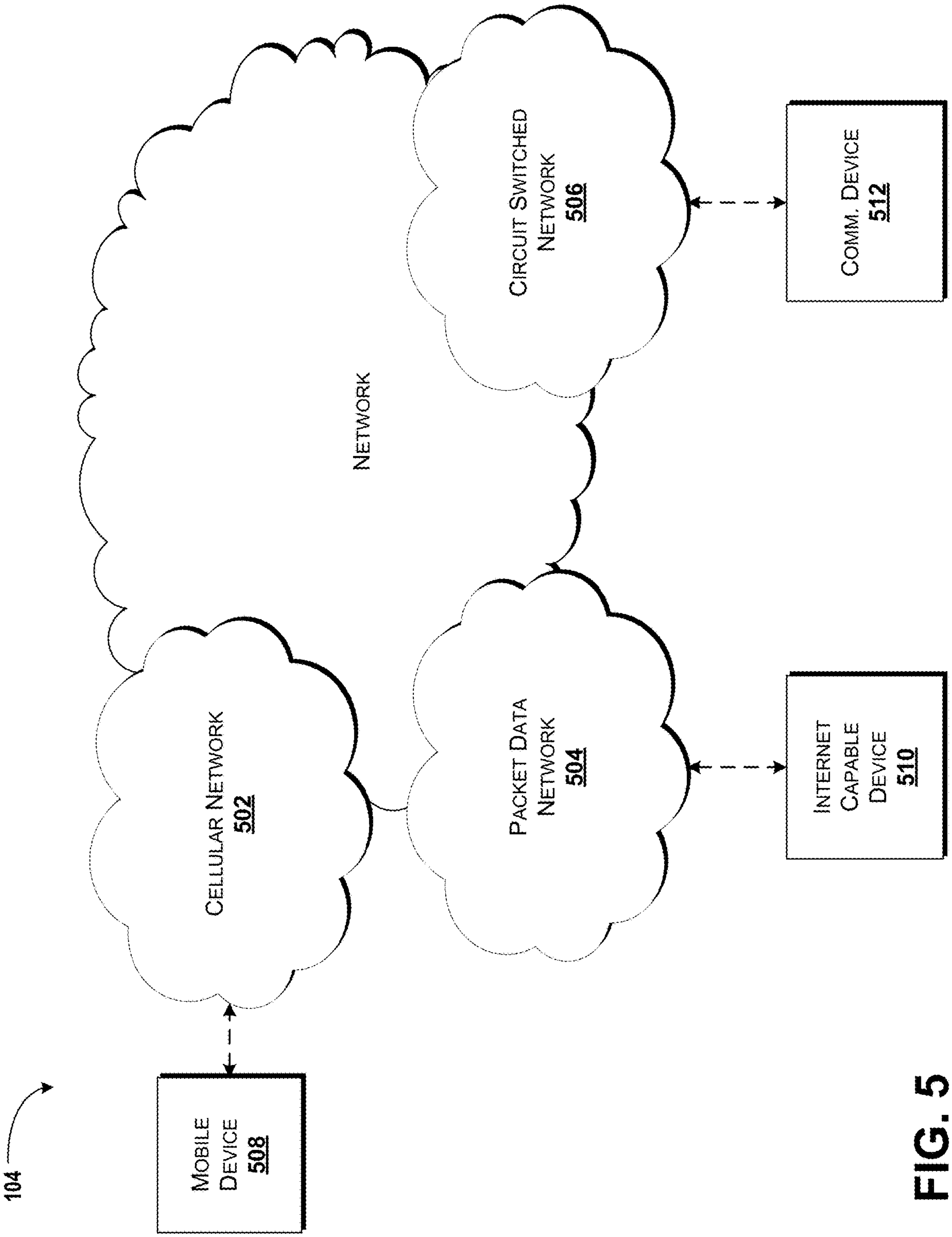
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
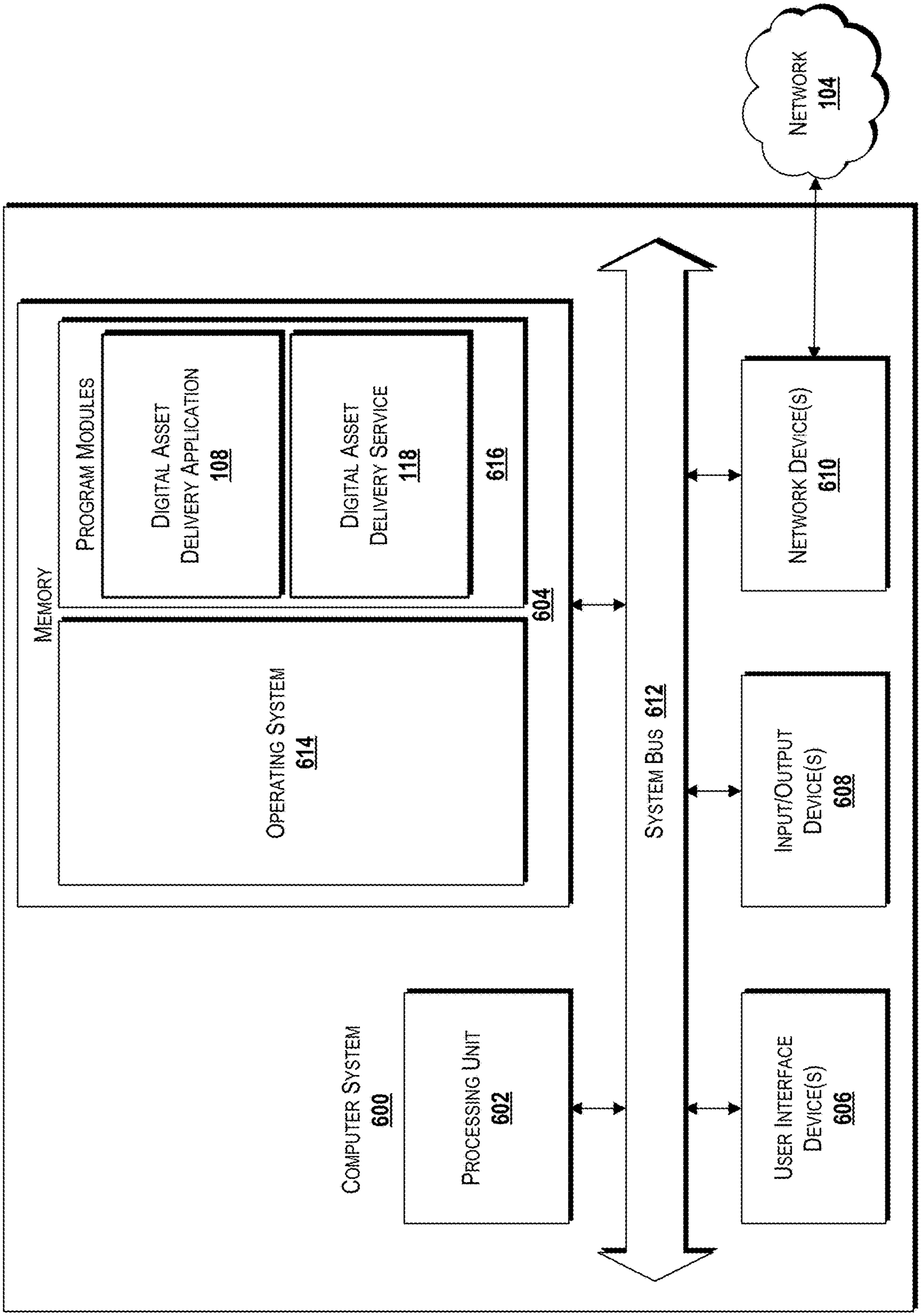
FIG. 6 is a block diagram illustrating an example computer system configured to provide and/or interact with a digital asset delivery service, according to some illustrative embodiments of the concepts and technologies described herein.

FIG. 6 is a block diagram illustrating a computer system 600 configured to provide the functionality described herein for providing and using a digital asset delivery service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the digital asset delivery application 108 and/or the digital asset delivery service 118. These and/or other programs can be embodied in computer-readable media containing instructions that, when executed by the processing unit 602, perform one or more of the methods 200, 300, and/or 400 described in detail above with respect to FIGS. 2-4 and/or other functionality as illustrated and described herein. It can be appreciated that, at least by virtue of the instructions embodying the methods 200, 300, and/or 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the digital asset delivery request 116, the digital assets 110, the keys 124, the ledger 126, the bid request 128, the bids 130, the commands 132, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
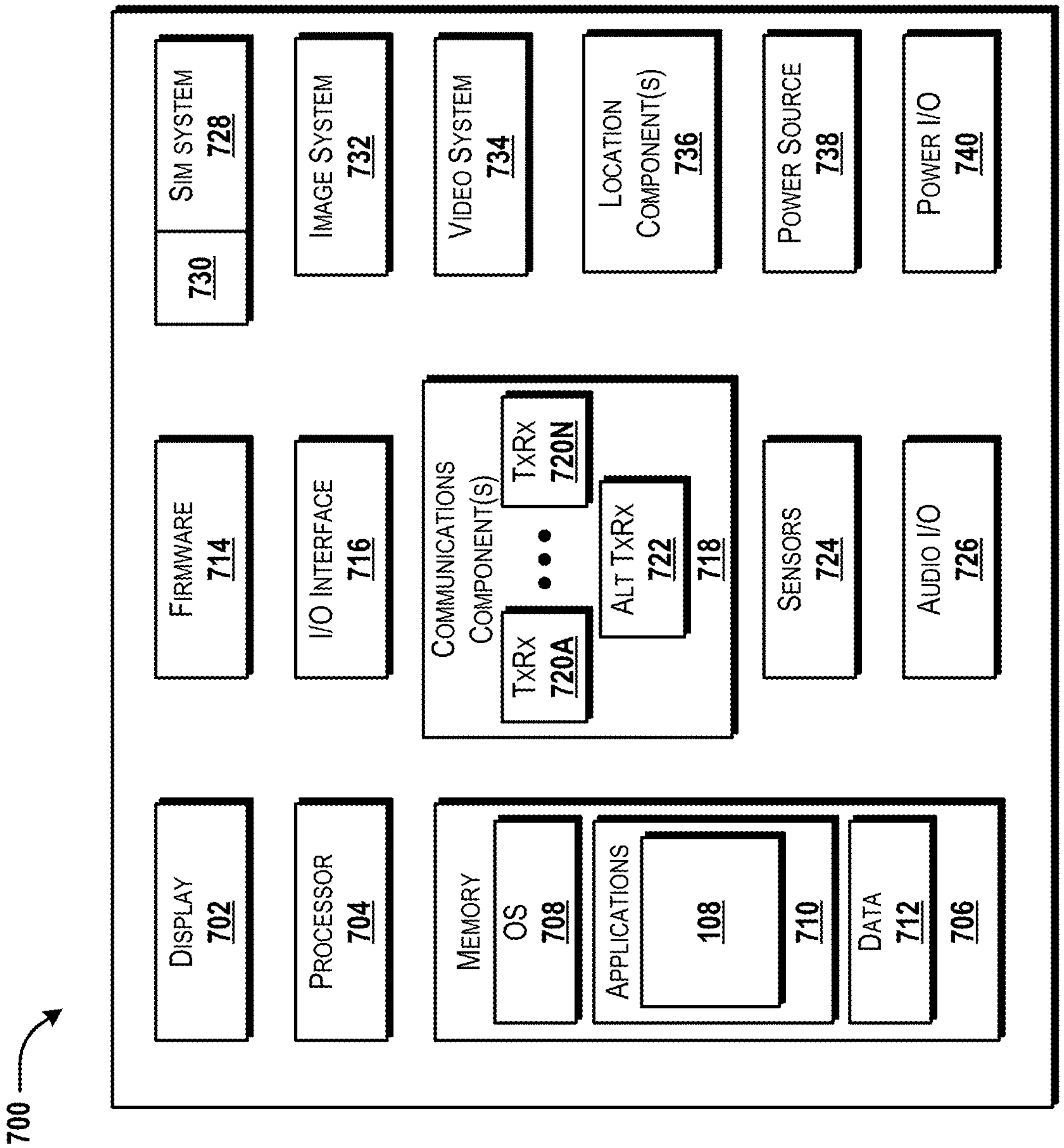
FIG. 7 is a block diagram illustrating an example mobile device configured to interact with a digital asset delivery service, according to some illustrative embodiments of the concepts and technologies described herein.

Turning now to FIG. 7, an illustrative mobile device 700 and components thereof will be described. In some embodiments, the user device 102, the recipient device 112, and/or other devices described above with reference to FIGS. 1-4 can be configured as and/or can have an architecture similar or identical to the mobile device 700 described herein in FIG. 7. It should be understood, however, that the user device 102 and/or the recipient device 112 may or may not include the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the digital asset delivery application 108, the digital asset delivery service 118, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, identifying digital assets 110 and/or recipients (such as the recipient device 112), configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, digital asset delivery application 108, the digital asset delivery service 118, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the mobile device 700 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, the digital asset delivery request 116, the digital assets 110, the keys 124, the ledger 126, the bid request 128, the bids 130, the commands 132, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an Nth transceiver ("TxRx") 720N that can operate in a second communications mode relative to the first transceiver 720A (e.g., UMTS). While two transceivers 720A-N(hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
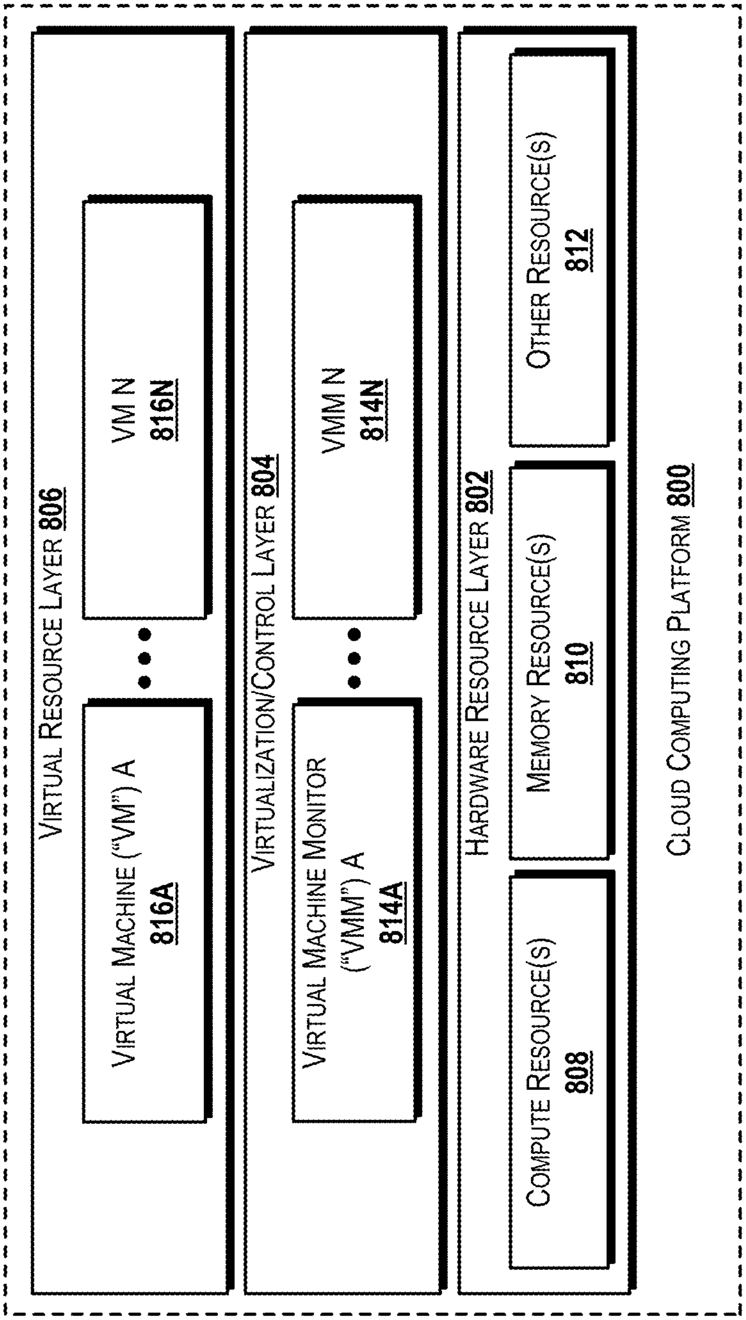
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing and using a digital asset delivery service and/or for interacting with the digital asset delivery application 108 and/or the digital asset delivery service 118. Thus, it can be appreciated that in some embodiments of the concepts and technologies disclosed herein, the cloud computing platform 800 illustrated in FIG. 8 can be used to provide the functionality described herein with respect to the user device 102, one or more recipient devices 112, one or more data sources 114, the server computer 120, and/or the one or more network resources 122.

The cloud computing platform 800 thus may be utilized to execute any aspects of the software components presented herein. Thus, according to various embodiments of the concepts and technologies disclosed herein, the digital asset delivery application 108, the data sources 114, the digital asset delivery service 118, and/or the network resources 122 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the digital asset delivery application 108, the digital asset delivery service 118, and/or the data sources 114 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the digital asset delivery application 108, the digital asset delivery service 118, and/or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the digital asset delivery request 116, the data sources 114, the digital assets 110, the keys 124, the ledger 126, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing and using a digital asset delivery service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising obtaining a digital asset delivery request that identifies a digital asset that is to be provided to a recipient device, wherein the digital asset delivery request comprises a token that is used to track delivery of the digital asset to the recipient device, determining, based on the digital asset delivery request, a data source that is to provide a plurality of digital asset components of the digital asset to the recipient device, and a network resource via which the data source is to provide the plurality of digital asset components to the recipient device, generating a ledger comprising instructions for constructing the digital asset at the recipient device by combining the plurality of digital asset components, triggering delivery, from the data source and to the recipient device via the network resource, of the plurality of digital asset components, the ledger, and the token, wherein the recipient device combines the plurality of digital asset components in accordance with the ledger to create the digital asset, and tracking, using the token, delivery of the digital asset to the recipient device.

2. The system of claim 1, wherein the data source comprises a plurality of data sources, wherein the network resource comprises a plurality of network resources, and wherein triggering delivery of the plurality of digital asset components comprises triggering delivery of the plurality of digital asset components via the plurality of network resources.

3. The system of claim 1, wherein the data source comprises a plurality of data sources, and wherein triggering delivery of the plurality of digital asset components comprises triggering delivery of a first digital asset component of the plurality of digital asset components by a first data source and triggering delivery of a second digital asset component of the plurality of digital asset components by a second data source.

4. The system of claim 1, wherein a first digital asset component of the plurality of digital asset components comprises an audio file, wherein a second digital asset component of the plurality of digital asset components comprises a video file, wherein a third digital asset component of the plurality of digital asset components comprises an indication of digital rights, and wherein tracking the delivery of the digital asset comprises tracking delivery of each of the plurality of digital asset components using the token.

5. The system of claim 1, wherein the data source comprises a plurality of data sources, wherein the network resource comprises a plurality of network resources, and wherein determining the data source and the network resource comprises:

generating a bid request that specifies the plurality of digital asset components, the recipient device, and delivery requirements for the plurality of digital asset components;

evaluating a plurality of bids, each of the plurality of bids proposing delivery of a digital asset component of the plurality of digital asset components to the recipient device by a data source of the plurality of data sources and via a network resource of the plurality of network resources; and evaluating the plurality of bids to identify the data source and the network resource.

6. The system of claim 1, wherein obtaining the digital asset delivery request comprises receiving the digital asset delivery request from a user device, and wherein the digital asset delivery request comprises components data that comprises a plurality of file locations, each of the plurality of file locations corresponding to a respective digital asset component of the plurality of digital asset components.

7. The system of claim 1, wherein obtaining the digital asset delivery request comprises receiving the digital asset delivery request from a user device, and wherein the digital asset delivery request comprises components data comprising a first digital asset component of the plurality of digital asset components and a file locations of a second digital asset component of the plurality of digital asset components.

8. A method comprising:

obtaining, at a server computer comprising a processor, a digital asset delivery request that identifies a digital asset that is to be provided to a recipient device, wherein the digital asset delivery request comprises a token that is used to track delivery of the digital asset to the recipient device;

determining, by the processor and based on the digital asset delivery request, a data source that is to provide a plurality of digital asset components of the digital asset to the recipient device, and a network resource via which the data source is to provide the plurality of digital asset components to the recipient device;

generating, by the processor, a ledger comprising instructions for constructing the digital asset at the recipient device by combining the plurality of digital asset components;

triggering, by the processor, delivery, from the data source to the recipient device via the network resource, of the plurality of digital asset components, the ledger, and the token, wherein the recipient device combines the plurality of digital asset components in accordance with the ledger to create the digital asset; and tracking, by the processor and using the token, delivery of the digital asset to the recipient device.

9. The method of claim 8, wherein the data source comprises a plurality of data sources, wherein the network resource comprises a plurality of network resources, and wherein triggering delivery of the plurality of digital asset components comprises triggering delivery of the plurality of digital asset components via the plurality of network resources.

10. The method of claim 8, wherein the data source comprises a plurality of data sources, and wherein triggering delivery of the plurality of digital asset components comprises triggering delivery of a first digital asset component of the plurality of digital asset components by a first data source and triggering delivery of a second digital asset component of the plurality of digital asset components by a second data source.

11. The method of claim 8, wherein a first digital asset component of the plurality of digital asset components comprises an audio file, wherein a second digital asset component of the plurality of digital asset components comprises a video file, wherein a third digital asset component of the plurality of digital asset components comprises an indication of digital rights, and wherein tracking the delivery of the digital asset comprises tracking delivery of each of the plurality of digital asset components using the token.

12. The method of claim 8, wherein the data source comprises a plurality of data sources, wherein the network resource comprises a plurality of network resources, and wherein determining the data source and the network resource comprises:

generating a bid request that specifies the plurality of digital asset components, the recipient device, and delivery requirements for the plurality of digital asset components;

evaluating a plurality of bids, each of the plurality of bids proposing delivery of a digital asset component of the plurality of digital asset components to the recipient device by a data source of the plurality of data sources and via a network resource of the plurality of network resources; and evaluating the plurality of bids to identify the data source and the network resource.

13. The method of claim 8, wherein obtaining the digital asset delivery request comprises receiving the digital asset delivery request from a user device, and wherein the digital asset delivery request comprises components data that comprises a plurality of file locations, each of the plurality of file locations corresponding to a respective digital asset component of the plurality of digital asset components.

14. The method of claim 8, wherein obtaining the digital asset delivery request comprises receiving the digital asset delivery request from a user device, and wherein the digital asset delivery request comprises components data comprising a first digital asset component of the plurality of digital asset components and a file locations of a second digital asset component of the plurality of digital asset components.

15. A computer storage medium having computer-executable instructions stored thereon that, when executed by a processor, cause the processor to perform operations comprising:

obtaining a digital asset delivery request that identifies a digital asset that is to be provided to a recipient device, wherein the digital asset delivery request comprises a token that is used to track delivery of the digital asset to the recipient device;

determining, based on the digital asset delivery request, a data source that is to provide a plurality of digital asset components of the digital asset to the recipient device, and a network resource via which the data source is to provide the plurality of digital asset components to the recipient device;

generating a ledger comprising instructions for constructing the digital asset at the recipient device by combining the plurality of digital asset components;

triggering delivery, from the data source and to the recipient device via the network resource, of the plurality of digital asset components, the ledger, and the token, wherein the recipient device combines the plurality of digital asset components in accordance with the ledger to create the digital asset; and tracking, via the token, delivery of the digital asset to the recipient device.

16. The computer storage medium of claim 15, wherein the data source comprises a plurality of data sources, wherein the network resource comprises a plurality of network resources, and wherein triggering delivery of the plurality of digital asset components comprises triggering delivery of the plurality of digital asset components via the plurality of network resources.

17. The computer storage medium of claim 15, wherein the data source comprises a plurality of data sources, and wherein triggering delivery of the plurality of digital asset components comprises triggering delivery of a first digital asset component of the plurality of digital asset components by a first data source and triggering delivery of a second digital asset component of the plurality of digital asset components by a second data source.

18. The computer storage medium of claim 15, wherein the data source comprises a plurality of data sources, wherein the network resource comprises a plurality of network resources, and wherein determining the data source and the network resource comprises:

generating a bid request that specifies the plurality of digital asset components, the recipient device, and delivery requirements for the plurality of digital asset components;

evaluating a plurality of bids, each of the plurality of bids proposing delivery of a digital asset component of the plurality of digital asset components to the recipient device by a data source of the plurality of data sources and via a network resource of the plurality of network resources; and evaluating the plurality of bids to identify the data source and the network resource.

19. The computer storage medium of claim 15, wherein obtaining the digital asset delivery request comprises receiving the digital asset delivery request from a user device, and wherein the digital asset delivery request comprises components data that comprises a plurality of file locations, each of the plurality of file locations corresponding to a respective digital asset component of the plurality of digital asset components.

20. The computer storage medium of claim 15, wherein obtaining the digital asset delivery request comprises receiving the digital asset delivery request from a user device, and wherein the digital asset delivery request comprises components data comprising a first digital asset component of the plurality of digital asset components and a file locations of a second digital asset component of the plurality of digital asset components.

* * * * *